US011034336B2

(12) United States Patent
Frederick et al.

(10) Patent No.: US 11,034,336 B2
(45) Date of Patent: Jun. 15, 2021

(54) SYSTEMS, APPARATUS, AND METHODS TO REMOVE VEHICLE SENSOR DEBRIS

(71) Applicant: TOYOTA MOTOR ENGINEERING & MANUFACTURING NORTH AMERICA, INC., Plano, TX (US)

(72) Inventors: Scott L. Frederick, Brighton, MI (US); Scott P. Robison, Dexter, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 141 days.

(21) Appl. No.: 16/153,036

(22) Filed: Oct. 5, 2018

(65) Prior Publication Data
US 2020/0108801 A1 Apr. 9, 2020

(51) Int. Cl.
| | |
|---|---|
| B60S 1/56 | (2006.01) |
| B25J 17/02 | (2006.01) |
| B60S 1/52 | (2006.01) |
| B60S 1/48 | (2006.01) |

(52) U.S. Cl.
CPC .......... B60S 1/56 (2013.01); B25J 17/0258 (2013.01); B60S 1/481 (2013.01); B60S 1/522 (2013.01)

(58) Field of Classification Search
CPC .. B60S 1/56; B60S 1/522; B60S 1/481; B60S 1/528; B25J 17/0258
See application file for complete search history.

(56) References Cited

U.S. PATENT DOCUMENTS

| | | | |
|---|---|---|---|
| 6,257,500 B1 * | 7/2001 | Petzold | B60S 1/481 239/284.1 |
| 8,832,900 B2 | 9/2014 | Kaminaga et al. | |
| 9,126,534 B2 | 9/2015 | Snider | |
| 9,156,066 B2 | 10/2015 | Jonas | |
| 9,452,739 B2 | 9/2016 | Kikuta et al. | |
| 9,459,450 B2 | 10/2016 | Kemege | |
| 2009/0114254 A1 * | 5/2009 | Jeppe | F16L 55/05 134/34 |
| 2013/0291907 A1 | 11/2013 | Brozik et al. | |
| 2014/0060582 A1 | 3/2014 | Hartranft et al. | |
| 2015/0113754 A1 * | 4/2015 | Umeno | B60S 1/482 15/250.04 |
| 2016/0096512 A1 | 4/2016 | Giraud et al. | |
| 2016/0121855 A1 * | 5/2016 | Doorley | B60S 1/566 134/6 |

(Continued)

FOREIGN PATENT DOCUMENTS

CN 104865268 A 8/2015

*Primary Examiner* — Marthe Y Marc-Coleman
(74) *Attorney, Agent, or Firm* — Oblon, McClelland, Maier & Neustadt, L.L.P.

(57) ABSTRACT

Systems, apparatus, and methods to remove vehicle sensor debris are disclosed. A disclosed cleaning assembly for a vehicle includes a track coupled to the vehicle. The cleaning assembly also includes an arm adjustably coupled to the track and having a nozzle positioned on the arm. The arm is moveable, via the track, near an exterior surface of the vehicle that is associated with a vehicle sensor. The cleaning assembly also includes a first motor operatively coupled to the arm configured to move the arm along the track relative to debris positioned on the exterior surface. The cleaning assembly also includes a pump fluidly coupled to the nozzle configured to expel the fluid from the nozzle to remove the debris.

7 Claims, 7 Drawing Sheets

(56) References Cited

U.S. PATENT DOCUMENTS

| | | | |
|---|---|---|---|
| 2016/0207504 A1* | 7/2016 | Sasaki | B60S 1/485 |
| 2017/0080903 A1* | 3/2017 | Kiyama | B60S 1/522 |
| 2017/0313287 A1* | 11/2017 | Davies | B60S 1/56 |
| 2018/0370500 A1* | 12/2018 | Garcia Crespo | G02B 27/0006 |
| 2019/0016306 A1* | 1/2019 | Krishnan | G01N 21/15 |
| 2019/0016307 A1* | 1/2019 | Negi | B60S 1/0814 |
| 2019/0135239 A1* | 5/2019 | Rice | B60S 1/54 |

* cited by examiner

SYSTEMS, APPARATUS, AND METHODS TO REMOVE VEHICLE SENSOR DEBRIS

FIELD OF THE DISCLOSURE

This disclosure relates generally to vehicles and, more particularly, to systems, apparatus, and methods to remove vehicle sensor debris.

BACKGROUND

Motor vehicles typically employ sensor systems to improve vehicle performance, safety, and/or driver comfort. For example, a vehicle having autonomous functionality (sometimes referred to as an autonomous vehicle) utilizes sensors positioned on a roof, a fender, a side panel, etc. to generate data corresponding to parameters associated with the vehicle and/or a driving surface, which enables a controller to drive the vehicle without assistance from a driver. To ensure proper autonomous vehicle control, these sensors need to be properly maintained and/or have a field of view (FOV) that is free from obstructions.

SUMMARY

An example cleaning assembly for a vehicle includes a track coupled to the vehicle. The cleaning assembly also includes an arm adjustably coupled to the track and having a nozzle positioned thereon. The arm is moveable, via the track, near an exterior surface of the vehicle that is associated with a vehicle sensor. The cleaning assembly also includes a first motor operatively coupled to the arm configured to move the arm along the track relative to debris positioned on the exterior surface. The cleaning assembly also includes a pump fluidly coupled to the nozzle configured to expel the fluid from the nozzle to remove the debris.

An example vehicle includes a controller configured to control a first motor operatively coupled to an arm including a nozzle positioned thereon. The arm is adjustably coupled to a track on the vehicle and configured to move, via output of the first motor, along the track relative to sensor debris on an exterior surface of the vehicle. The nozzle receives a fluid and directs the fluid away therefrom. The controller also adjusts the output of the first motor to position the nozzle proximate to the sensor debris such that the fluid removes the sensor debris from the exterior surface.

An example tangible machine-readable medium includes instructions that, when executed, cause a processor to at least control a first motor operatively coupled to an arm having a nozzle positioned thereon. The arm is adjustably coupled to a track on the vehicle and configured to move, via output of the first motor, along the track relative to sensor debris on an exterior surface of the vehicle. The nozzle receives a fluid and directs the fluid away therefrom. The instructions also cause the processor to adjust the output of the first motor to position the nozzle proximate to the sensor debris such that the fluid removes the sensor debris from the exterior surface The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

In general, the same reference numbers will be used throughout the drawing(s) and accompanying written description to refer to the same or like parts.

DETAILED DESCRIPTION

Some known vehicle sensor cleaning systems perform cleaning operations for sensors of a vehicle when an obstruction or debris is adversely affecting autonomous vehicle functionality. For example, bugs, dirt, dust, snow, ice, etc. may buildup directly on a sensor (e.g., a camera, a LiDAR, a Radar, etc.) or glass in front of the sensor during vehicle use, which impedes the sensor from properly operating. Typically, when such an obstruction is detected, a known sensor cleaning system utilizes a nozzle that is positioned proximate to the sensor and configured to apply a cleaning fluid onto the affected sensor to remove the obstruction. Additionally, the known cleaning system may control (e.g., via a motor and/or actuator) a wiper to engage the sensor and/or a surface proximate thereto to further remove the obstruction or the cleaning fluid. However, these known sensor cleaning systems may fail to effectively clean multiple vehicle sensors due to a limited range of movement of the nozzle and/or the wiper. Further, the above-mentioned known sensor cleaning systems may impede sensor functionality by obstructing a FOV associated with the sensor when sensor cleaning system is not cleaning and/or otherwise not in use. As a result, the above mentioned known sensor cleaning systems may adversely affect functionality of a vehicle during autonomous operation.

Systems, apparatus, and methods to remove vehicle sensor debris are disclosed. Examples disclosed herein detect, via vehicle sensor data, sensor debris (e.g., bugs, dirt, dust, snow, ice, and/or other contaminants) that is positioned on an exterior surface associated with a vehicle and proximate to one or more vehicle sensors. For example, the debris may form or buildup directly on the sensor(s) or a transparent surface interposed between the sensor(s) and an exterior of the vehicle such that the debris obstructs a FOV associated with the sensor(s). Disclosed examples determine, based on the vehicle sensor data, one or more observed parameters (e.g., a relative location, a size, a shape or geometry, etc.) of the debris and, in response, position an example nozzle proximate to the debris. The nozzle is configured to receive one or more fluids (e.g., a cleaning solution, air, etc.) and direct the fluid(s) away therefrom. In particular, when the nozzle is properly positioned, disclosed examples expel (e.g., via a pump) the fluid(s) from the nozzle to clean and/or otherwise remove the sensor debris from the FOV, which improves sensor functionality as well as vehicle safety during autonomous vehicle operation.

Some disclosed examples provide an example track (e.g., one or more rails for guiding movement) that is configured to couple to a portion of the vehicle, which facilitates positioning the nozzle and/or one or more components associated therewith. In some examples, an example arm is operatively interposed between the nozzle and the track to carry or support the nozzle. In such examples, the arm adjustably coupled to the track and moveable, via the track, along path (e.g., a straight and/or a curved path) proximate to the exterior vehicle surface associated with the sensor(s). In particular, disclosed examples provide an example vehicle controller (e.g., an electronic control unit (ECU)) that is configured to move, via a motor and/or an actuator, the arm along the track across at least a portion of the path such that the nozzle is properly positioned to allow for effective debris removal via the fluid(s). More particularly, the disclosed vehicle controller controls output of the motor based on the observed debris parameter(s), for example, via one or more equations, plots, tables, maps, empirical relationships, etc. that correlate the observed parameter(s) to appropriate motor output. In this manner, disclosed examples are able to rapidly restore a FOV to multiple vehicle sensors located at different positions on the vehicle, which would have otherwise been unattainable using the above-mentioned known sensor cleaning systems. Further, examples disclosed herein do not interfere with autonomous operation of the vehicle such that the debris can be effectively cleaned or removed while the vehicle is driving.

Additionally, some disclosed examples aim the nozzle at the debris based on the observed parameter(s) to more effectively remove the debris via the fluid(s). In such examples, the arm includes a joint interposed between a first portion of the arm that is adjustably coupled to the track and a second portion of the arm that has the nozzle positioned thereon. The joint enables the second portion of the arm and the nozzle to rotate relative to one or more axes defined by the joint. In particular, the controller is configured to change an orientation, via another motor operatively coupled to the joint, of the second portion of the arm and the nozzle such that the fluid(s) are better directed toward debris when expelled from the nozzle. Further, in this manner, the arm and the nozzle can be packaged or positioned out of the FOV associated with the sensor(s) when not in use and/or when debris is not detected. Further still, in some examples, the arm is telescopic such that a length of the arm is configured to increase or decrease, which facilitates reducing a distance between the nozzle and the sensor debris.

Additionally, some disclosed examples determine a size of the debris, a shape of the debris, a type of the debris, etc. based on the sensor data, which may indicate a particular fluid parameter (e.g., a fluid pressure, a flow rate, etc.) that is particularly effective in removing the debris. For example, some debris may be more easily removed by expelling the fluid from the nozzle at a relatively high fluid pressure, flow rate, etc. Accordingly, in response to determining such characteristics and/or parameters associated with the debris, disclosed examples expel the fluid(s) with the particular fluid parameter(s).

Figure 1A:
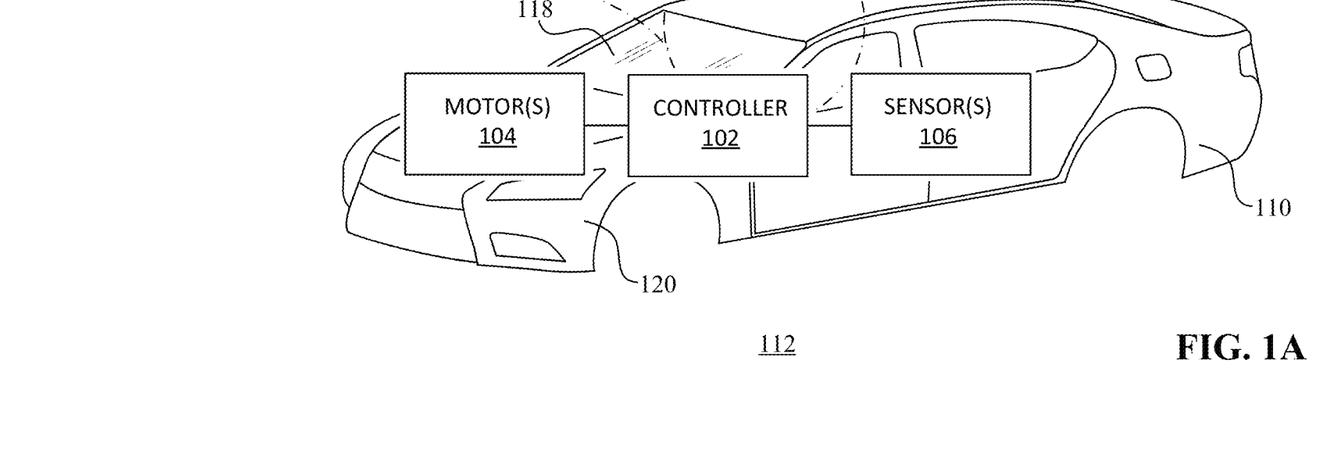
FIG. 1A is a view of an example vehicle in which examples disclosed herein can be implemented.

FIG. 1A is a view of an example vehicle (e.g., a car, a van, a truck, a sport utility vehicle (SUV), etc.) 100 in which examples disclosed herein can be implemented. According to the illustrated example of FIG. 1, the vehicle 100 includes an example controller 102, one or more example motors (e.g., electric motor(s)) 104, and one or more example sensors 106. The controller 102 is configured to detect, via the sensor(s) 106, a condition of the vehicle 100 and/or the sensor(s) 106 indicative of obstruction(s) and/or debris (e.g., dirt, dust, bugs, snow, road debris, etc.) that are on the vehicle 100 and positioned near at least one of the sensor(s) 106, which may interfere with vehicle functionality (e.g., autonomous functionality). In response to determining the condition, the controller 102 advantageously controls the motor(s) 104 to move and/or position an adjustable nozzle 202 (shown in FIG. 2) and expel (e.g., spray) one or more fluids from the nozzle 202, thereby removing the debris, which is discussed in greater detail below in connection with FIGS. 1B, 2, 3A, 3B, and 4-7. In particular, the nozzle 202 is adjustably coupled to the vehicle 100 via an example track 108 (FIG. 1B) that is positioned on the vehicle 100 and configured to direct and/or guide movement of the nozzle 202 to different areas of the vehicle 100.

The controller 102 of FIG. 1A may be implemented, for example, using one or more electronic control units (ECUs). In particular, the controller 102 is communicatively coupled to the sensor(s) 106 to receive data therefrom and the motor(s) 104 to control output thereof (e.g., a force and/or a torque), for example, via a transmission or signal wire, a bus (e.g., a control area network (CAN)), radio frequency, etc.

The sensor(s) 104 of FIG. 1A include one or more light detection and ranging units (sometimes referred to as LiDAR(s)), one or more radar units, one or more cameras, one or more proximity sensors, and/or any other appropriate sensor(s) that enable or facilitate autonomous functionality for the vehicle 100, improve vehicle performance, and/or improve vehicle safety. In particular, the sensor(s) 106 are disposed proximate to or on an exterior surface 110 of the vehicle 100 and configured to generate, obtain, and/or otherwise provide data associated with the vehicle 100 and/or a driving surface (e.g., concrete, asphalt, dirt, etc.) 112 on which the vehicle 100 is positioned. For example, the sensor(s) 106 may provide data that identifies and/or indicates positions of objects proximate to the vehicle 100, lane markers, other vehicles, pedestrians, etc.

The sensor(s) 106 of FIG. 1A are operatively coupled to the vehicle 100 and may be positioned in various locations. In some examples, the sensor(s) 106 are disposed in an example vehicle cover or enclosure 114 (FIG. 1B) (sometimes referred to as a sensor enclosure) that is coupled to a portion (e.g., a roof 116) of the vehicle 100. Additionally or alternatively, in some examples, one or more of the vehicle sensor(s) 106 are positioned on the vehicle 100 differently, for example, beneath a vehicle windshield 118, on a vehicle fender 120, or any other suitable vehicle location.

Figure 1B:
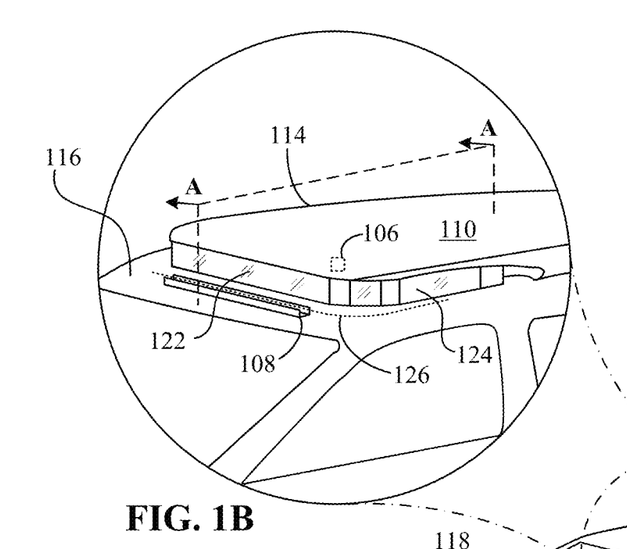
FIG. 1B is an enlarged partial-view of the example vehicle of FIG. 1A and shows and example sensor enclosure.

According to the illustrated example of FIG. 1B, the enclosure 114 has any suitable size, shape, and/or structure to sufficiently contain the sensor(s) 106 and/or component(s) associated therewith. The enclosure 114 of FIG. 1B protrudes from the vehicle 100 to extend the exterior surface 110. In particular, to protect the sensor 106 and/or provide a sufficient FOV thereto, the enclosure 114 includes one or more example surfaces 122, 124 that are interposed between the sensor(s) 106 and an exterior of the vehicle 100, two of which are shown in this example (i.e., a first surface 122 and a second surface 124). The surface(s) 122, 124 of FIG. 1B may be constructed of one or more transparent materials such as, for example, glass, plexiglass, etc. In particular, the surface(s) 122, 124 enable light to enter into the enclosure 114 and emit out from the enclosure, which facilitates sensor functionality. Although FIG. 1B depicts the enclosure 120 positioned on the roof 118, in other examples, the enclosure 120 may be positioned on any other suitable location of the vehicle 100.

The track 108 of FIG. 1B is coupled (e.g., removably coupled) to a portion of the vehicle 100 and defines an example path (e.g., a straight path and/or a curved path) 126 (as represented by the dotted/dashed line of FIG. 1B), for example, via one or more appropriate fasteners (e.g., a bolt, a screw, a nut, etc.) and/or one or more appropriate fastening methods or techniques (e.g., via welding, an adhesive, etc.). In particular, the path 126 extends proximate to (e.g., on, under, and/or over) the exterior surface 110 toward different areas of the vehicle 100 that may have sensor debris thereon and/or are prone to debris buildup. For example, as shown, the path 126 is adjacent the first surface 122 and extends (e.g., linearly) along at least a portion of a length of the first surface 122. Although FIG. 1B depicts the track 108 as substantially straight or linear, in other examples, the track 108 and, thus, the path 126 are shaped differently (e.g., curved) to reach different areas (e.g., the second surface 124) of the vehicle 100 that may be associated with debris.

Figure 2:
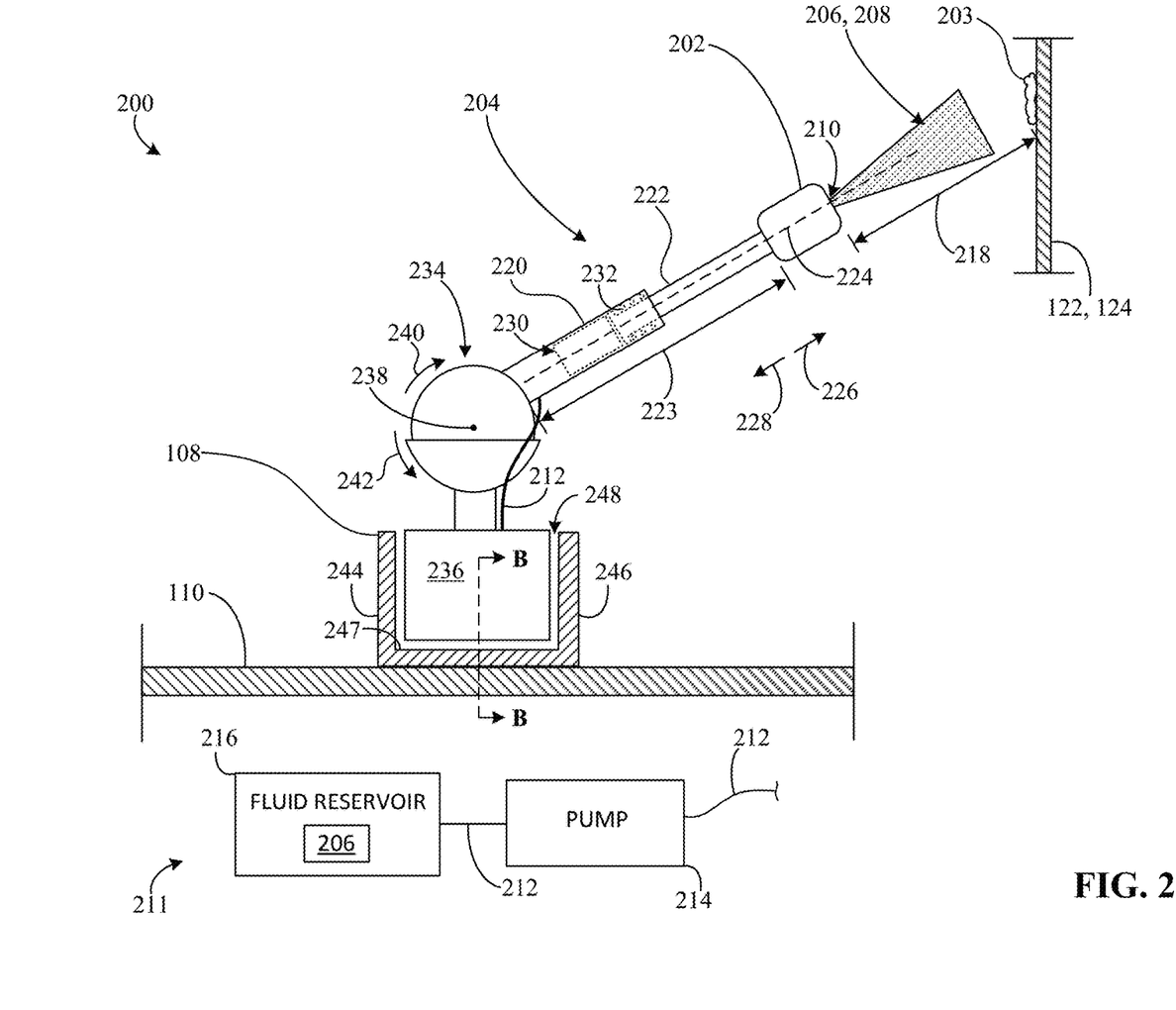
FIG. 2 is a partial cross-sectional view of the example vehicle 100 of FIG. 1A along line A-A and shows an example cleaning assembly in accordance with the teachings of this disclosure.

FIG. 2 is a partial cross-sectional view of the vehicle 100 and the track 108 of FIG. 1A along line A-A and shows an example cleaning assembly 200 in accordance with the teachings of this disclosure. The cleaning assembly 200 of FIG. 2 includes one or more of the motor(s) 104 of FIG. 1, the track 108 of FIG. 1, and the aforementioned nozzle 202 for cleaning the surface(s) 122, 124 of the vehicle 100 and/or otherwise removing example debris 203 (e.g., bugs, dirt, dust, snow, ice, and/or other contaminants) (sometimes referred to as sensor debris) from the surface(s) 122, 124. As shown in FIG. 2, at least one of the vehicle surface(s) 122, 124 has the debris 203 disposed thereon, which may impede functionality of the sensor(s) 106 that rely on the surface(s) 122, 124 remaining substantially free of obstructions. In particular, disclosed examples control the motor(s) 104 to advantageously position the nozzle 202 and/or aim the nozzle 202 at the debris 203 to enable debris removal, as discussed below.

In some examples, the cleaning assembly 200 of FIG. 2 includes an example arm 204 interposed between the track 108 and the nozzle 202 to carry and/or support the nozzle 202. The arm 204 of FIG. 2 is adjustably coupled to the track 108 and extends away from the track 108 to receive the nozzle 202 (e.g., at an end of the arm 204). As shown in FIG. 2 the nozzle 202 is coupled to the arm 204, for example, via one or more appropriate fasteners (e.g., screws, bolts, nuts, etc.) and/or one or more appropriate fastening methods or techniques (e.g., via welding, via an adhesive, etc.). As such, the arm 204 of FIG. 2 is constructed of one or more materials (e.g., plastic, metal, etc.) having sufficient strength and/or rigidity to carry or support the nozzle 202 and/or one or more components associated therewith (e.g., a motor, a pump, a fluid line, etc.).

To facilitate positioning the nozzle 202, the cleaning assembly 200 includes an example actuator system (e.g., the first actuator system 300 or the second actuator system 302 (shown in FIGS. 3A and 3B)) that is operatively coupled to the arm 204 and configured to move the arm 204 along the track 108 to different areas of the vehicle 100 and/or across at least a portion of the path 126. As such, the disclosed actuator system is also operatively coupled a first one of the motor(s) 104 of FIG. 1A (i.e., a first motor) to enable such positional control based on control signal(s) or command(s) provided by the vehicle controller 102, as discussed further below in connection with FIGS. 3A and 3B. As shown in FIG. 2, the nozzle 202 and the arm 204 are in a first position such that the nozzle 202 is proximate to and/or aimed at the debris 203. When properly positioned and/or aimed at the debris 203 (as shown in FIG. 2), disclosed examples enable the nozzle 202 to expel a first example fluid (e.g., a cleaning fluid, water, etc.) 206 and/or a second example fluid (e.g., air) 208 from an outlet 210 of the nozzle 202. As such, the nozzle 202 directs the fluid(s) 208, 210 toward the surface(s) 122, 124 and/or the debris 203.

To supply and/or control the fluid(s) 206, 208, the cleaning assembly 200 includes an example fluid supply system 211 in fluid communication with the nozzle 202 and communicatively coupled to the controller 102. As shown in FIG. 2, the fluid supply system 211 includes one or more example fluid lines or channels (e.g., a tube, a pipe, a channel, etc.) 212 for conveying the fluid(s) 206, 208, at least one of which is partially positioned external to the arm 204 in this example. In some examples, the fluid channel(s) 212 are positioned within and/or formed by at least a portion of the arm 204 and extend at least partially (e.g., entirely) through the arm 204. In particular, the fluid supply system 211 also includes a pump or compressor 214 that is operatively coupled to a second one of the motor(s) 104 of FIG. 1A (i.e., a second motor) and configured to change one or more parameters (e.g., a fluid pressure, a flow rate, etc.) of the fluid(s) 206, 208. The pump 214 of FIG. 2 is fluidly coupled to the nozzle 202 via the fluid line(s) 212 to provide the fluid(s) 206, 208 thereto.

Additionally, in some examples, the fluid supply system 211 includes an example fluid reservoir 216 (e.g., a tank coupled to the vehicle 100) that contains and/or stores (e.g., temporarily) the fluid(s) 206, 208. In such examples, the fluid reservoir 216 is fluidly coupled, via the fluid channel(s) 214, to the pump 214 such that the pump 214 draws the fluid(s) 208, 210 from the fluid reservoir 216. As shown in FIG. 2, the fluid channel(s) 212 of FIG. 2 extend from the fluid reservoir 216 to the outlet 210 of the nozzle 202.

In some examples, the pump 214 of FIG. 2 is coupled directly to a portion of the arm 204 such that the pump 214 moves cooperatively with the arm 204. However, in some examples, the pump 214 is separate from the arm 204 and coupled to, for example, a portion of the vehicle 100 and/or the track 108 such that the pump 214 does not move with arm 204. Similarly, in some examples, the fluid reservoir 216 is coupled directly to a portion of the arm 204 or separate from the arm 204.

The first fluid 206 of FIG. 2 includes one or more liquids associated with cleaning sensor debris such as, for example, water and/or one or more chemicals (e.g., alcohol) such as methanol (sometimes referred to as wiper or washer fluid). The second fluid 208 of FIG. 2 includes air and/or any other suitable gas to facilitate removing the debris and/or the first fluid 206 from the surface(s) 122, 124. Further, in some examples, the fluid supply system 211 includes two pumps or compressors, each of which is associated with controlling a respective one of the fluids 206, 208. However, in some examples, a single pump or compressor is configured to control both fluids 206, 208.

To move the arm 204 along the track 108 to one or more particular positions on the path 126, the first one of the motor(s) 104 provides motor output to a portion of the arm 204 in response to receiving a control signal or command from the controller 102. In particular, the first one of the motor(s) 104 generates a force and/or a torque and imparts (e.g., directly or via one or more components interposed between the arm 204 and the motor(s) 104) the force and/or the torque on the arm 204. As a result, the nozzle 202 and the arm 204 move, based on the force or torque, predictably along the track 108 to or near the particular position(s). In this manner, disclosed examples reduce (e.g., minimize) a distance 218 defined between the nozzle 202 and the debris 203.

In some examples, to further reduce the distance 218 between the nozzle 202 and the debris 203, the arm 204 of FIG. 2 includes multiple portions 220, 222 that are slidably coupled together, two of which are shown in this example, (i.e., a first portion 220 and a second portion 222). In such examples, the arm 204 is considered to be telescopic such that the portions 220, 222 are configured to telescope and/or otherwise change a length 223 of the arm 204. For example, the second portion 222 of FIG. 2 has the nozzle 202 positioned thereon and is movably and/or slidably coupled to the first portion 220. In particular, the second portion 222 is configured to move relative to the first portion 220 along a first axis 224 defined by the first and second portions 220, 222 in a first linear direction 226 and/or a second linear direction 228 opposite the first linear direction 226. As the second portion 222 moves, the second portion 222 substantially maintains an orientation thereof relative to the first portion 220, for example by engaging the first portion 220 (e.g., an inner and/or an outer surface thereof). Further, in some such examples, the arm 204 includes a seal (e.g., an O-ring) operatively coupled between the first and second portions 220, 222 to prevent the fluid(s) 206, 208 from leaking.

Although FIG. 2 depicts the arm 204 having the two portions 220, 222, in some examples, the arm 204 includes one or more additional portions that are similarly configured to telescope. However, in some examples, the arm 204 is implemented as a single or integral component.

In some examples, to urge the second portion 222 away from the first portion 220, the arm 204 includes an inner space (e.g., a chamber) 230 formed by the first and second portions 220, 222 that is configured to receive the fluid(s) 206, 208. In particular, when the fluid(s) 206, 208 enter and/or flow through the inner space 230, the fluid(s) 206, 208 impart a fluid pressure and/or force on an inner surface of the second portion 222, thereby moving the second portion 222 along the axis 224 in the first linear direction 226 toward or to an extended position, which increases the length 223 of the arm 204. In such examples, the inner space 230 of FIG. 2 is considered to form a portion of the fluid channel(s) 212.

Further, in some examples, to urge the second portion 222 toward the first portion 220, the cleaning assembly 200 includes an example spring (e.g., a coil spring) 232 that is operatively coupled to the first and second portions 220, 222. In such examples, when the second portion 222 is in or near the extended position, the spring 232 imparts a force on the second portion 222, thereby moving the second portion 222 along the first axis 224 in the second linear direction 228 toward or to a retracted position, which decreases the length 223 of the arm 202. For example, the spring 232 is interposed between the first and second portions 220, 222 and may be positioned within the portions 220,222 or externally thereto.

Additionally, in some examples, to facilitate orienting the arm 204 and/or aiming the nozzle 202, the arm 204 includes an example joint (e.g., a pin joint, a ball joint, etc.) 234 operatively coupled to a third one of the motor(s) 104 (i.e., a third motor) and positioned between a third example portion 236 (sometimes referred to as a base portion) of the arm 204 and the first portion 220. In such examples, in response to receiving motor output from the third one of the motor(s) 104, the joint 234 enables the first portion 220, the second portion 222, and the nozzle 202 to rotate relative to at least a second axis 238 defined by the joint 234 in a first rotational direction (e.g., clockwise) 240 and/or a second rotational direction (e.g., counterclockwise) 242 opposite the first rotational direction 238. Further, in some examples, the joint 234 enables the first portion 220, the second portion 222, and the nozzle 202 to rotate relative to one or more other axes defined by the joint 234 in one or more other rotational directions. In such examples, the controller 102 controls the third one of the motor(s) 104 to generate a force and/or a torque and impart the force and/or the torque on or near the joint 234, thereby moving the first portion 220, the second portion 222, and the nozzle 202 relative to the one or more axes 238 in one or more of the rotational directions 240, 242.

The track 108 of FIG. 2 includes one or more rails 244, 246 for guiding movement of the arm 204 and/or protecting one or more components (e.g., an actuator and/or the motor(s) 104) associated therewith, two of which are shown in this example (i.e., a first rail 244, and a second rail 246). As shown in FIG. 2, the first and second rails 244, 246 extend away from a bottommost (in the orientation of FIG. 2) surface 247 of the tack 108 to form a space (e.g., a cavity) 248 therebetween to receive the third portion 236 of the arm 204. As shown in FIG. 2, the arm 204 extends out of the space 248 and away from the track 108 such that, when the nozzle 202 and the arm 204 are properly positioned, the outlet 210 of the nozzle 202 is proximate to (e.g., within about 0.5 inches, 1 inch, 2 inches, etc.) the debris 203. In some examples, as the arm 204 moves across at least a portion the track 108, the third portion 236 slidably engages the first rail 244 and/or the second rail 246 to limit movement of the arm 204 and/or maintain an orientation thereof. Further, in some examples, one or more components are operatively interposed between third portion 236 and the rail(s) 244, 246 to facilitate movement therebetween such as, for example, one or more wheels that are rotatably coupled to the third portion 236 and engage the rail(s) 244, 246. However, in some examples, the third portion 236 is spaced from the rail(s) 244, 246 and/or otherwise does not engage the rail(s) 244, 246 when moving along the track 108.

Figure 3A:
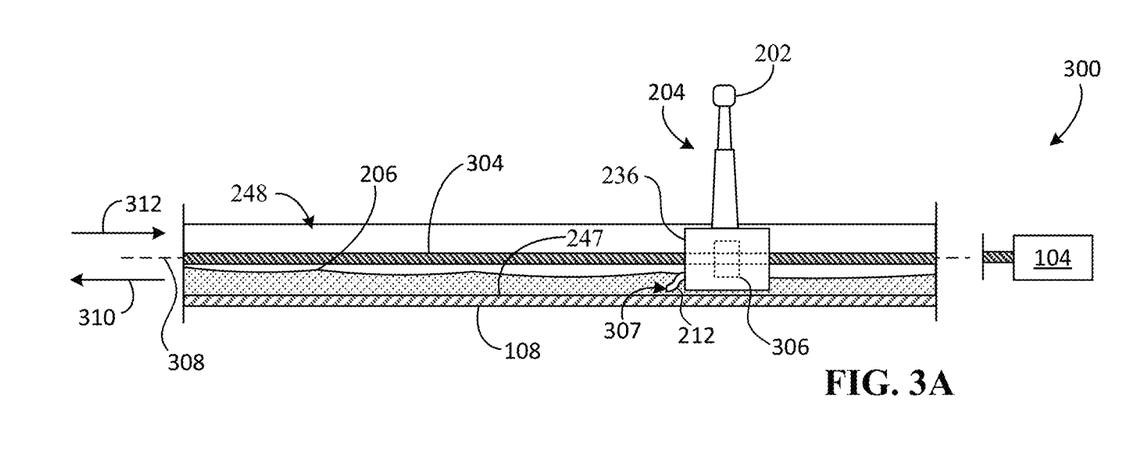
FIGS. 3A and 3B are cross-sectional views of an example track of the example cleaning system of FIG. 2 along line B-B and show first and second example actuator systems.
Figure 3B:
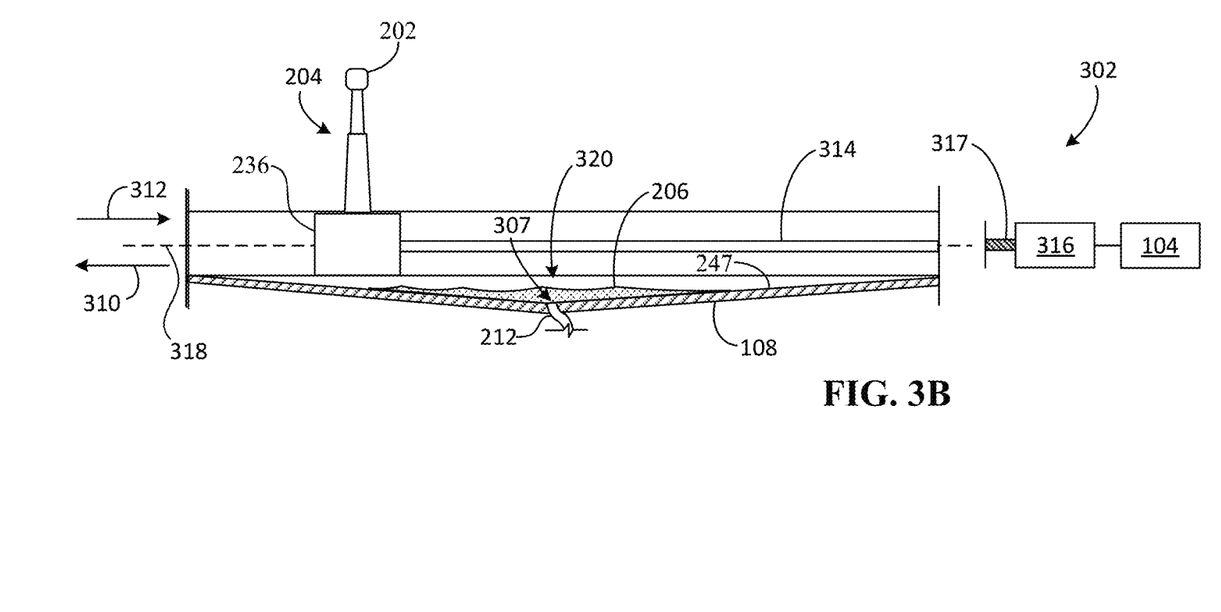

FIGS. 3A and 3B are cross-sectional views of the track 108 of cleaning system 200 of FIG. 2 along line B-B and show the aforementioned first and second example actuator systems 300, 302. In some examples, the first actuator system 300 of FIG. 3A or the second actuator system 302 of FIG. 3B is used to implement the cleaning assembly 200 of FIG. 2, as previously mentioned. According to the illustrated example of FIGS. 3A and 3B, each of the actuator systems 300, 302 is operatively interposed between the arm 204 and the first one of the motor(s) 104 to accurately or precisely position the nozzle 202 and the arm 204 based on motor output. As such, the first one of the motor(s) 104 is considered to be operatively coupled to the arm 204.

As shown in FIG. 3A, the first actuator system 300 includes a first rod or shaft 304 extending from the first one of the motor(s) 104 to the arm 204 for transferring motor output therebetween. In particular, at least a portion of the first shaft 304 has outer threads that engage inner threads of a first example ball screw 306 of the first actuator system 300. The first shaft 304 of FIG. 3A receives a torque and/or force from the first one of the motor(s) 104 and, as a result, rotates relative to a third axis 308 defined by the first shaft 304. As the first shaft 304 rotates, the first shaft 304 imparts another torque and/or another force on the ball screw 306 based on the motor output, thereby moving the nozzle 202 and the arm 204 along the third axis 308 in a third linear direction 310 and/or a fourth linear direction 312 opposite the third linear direction 310.

In such examples, to support the first shaft 304, the first shaft 304 is rotatably coupled to a portion (e.g., the first rail 244 and/or the second rail 246) of the track 108 and/or a portion of the vehicle 100, for example, via one or more bearings (e.g., ball bearing(s)). However, in some examples, the first shaft 304 is separate from the track 108 and supported only by the motor 104. As shown in FIG. 3A, the ball screw 306 is coupled to the third portion 236 of the arm 204. In some examples, the ball screw 306 is positioned within and/or formed by the third portion 236.

In some examples, the track 108 of FIG. 3A contains and/or stores the first fluid 206 in the space 248 for the pump 214, as shown in FIG. 3A. That is, in such examples, the fluid reservoir 216 is implemented by the track 216, which may allow the fluid channel(s) 212 to have a relatively short length with which to supply the first fluid 206. As shown in FIG. 3A, the fluid channel(s) 212 include an inlet 307 immersed or positioned in the first fluid 206. Additionally, in some such examples, the surface 247 of the track 108 is elastic and/or otherwise configured to flex or strain. In particular, as the arm 204 moves, a protruding portion associated with the arm 204 engages the surface 247 to cause the first fluid 206 to follow the arm 204 and/or accumulate at a bottommost portion of the surface 247.

As shown in FIG. 3B, the second actuator system 302 includes a second rod or shaft 314 extending from the first one of the motor(s) 104 to the arm 204 for transferring motor output therebetween. In particular, the second actuator system 302 of FIG. 3B includes a second example ball screw 316 operatively coupled between the motor(s) 104 and a threaded portion 317 of the shaft 314. The second ball screw 316 is sized, shaped, structured, and/or otherwise configured to transmit torque and/or force between the motor(s) 104 and the second shaft 314. For example, second ball screw 316 receives a torque and/or a force from the first one of the motor(s) 104 and, as a result, causes the second shaft 314 and the arm 204 to move substantially along a fourth axis 318 defined by the second shaft 314 in the third linear direction 310 and/or the fourth linear direction 312. As such, the second shaft 314 is coupled to the third portion 236 of the arm 204.

Additionally, in examples where the track 108 implements the fluid reservoir 216, the track 108 of FIG. 3B includes a recessed area 320 formed by the surface 247 to facilitate storing the first fluid 206. In particular, the first fluid 206 accumulates at a bottommost (in the orientation of FIG. 3B) portion of the recessed area 320, which allows the inlet 307 of the fluid channel(s) 214 to draw the first fluid 206 from the recessed area 320. As shown in FIG. 3B, the inlet 307 is positioned at or near the bottommost portion of the recessed area 320 and, in some examples, extends through the track 108.

Although FIGS. 3A and 3B depict the particular actuator systems 300, 302, in some examples, one or more other actuators (e.g., a linear or rotary actuator) may be used to similarly control movement of the arm 202 and nozzle 204 along the track 108.

Figure 4:
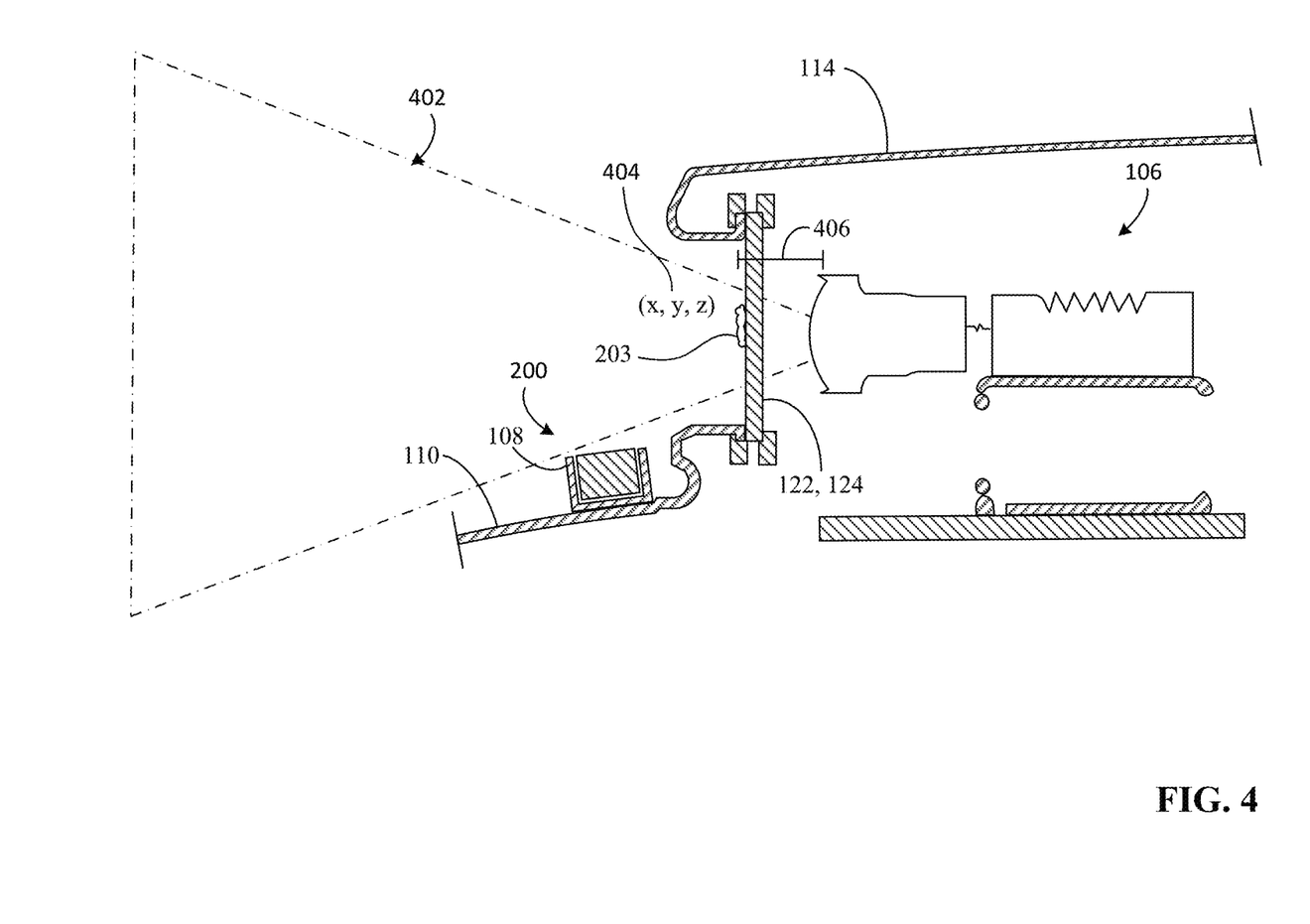
FIG. 4 is another partial cross-sectional view of the vehicle 100 of FIG. 1A along line A-A and shows an example vehicle sensor.

FIG. 4 is another partial cross-sectional view of the vehicle 100 and the track 108 of FIG. 1A along line A-A and shows one of the sensor(s) 106. The sensor 106 of FIG. 4 is positioned in the enclosure 114 and proximate to at least one of the surfaces 122, 124 such that an example field of view (FOV) 402 (as represented by the dotted/dashed lines of FIG. 4) is provided to the sensor 106 through the surface(s) 122, 124. As shown in FIG. 4, the example debris 203 of FIG. 2 is positioned on the surface(s) 122, 124 and in the FOV 402 associated with the sensor 106. As a result, the sensor 106 generates data that indicates one or more observed parameters associated with the debris 203 such as, for example, an observed position 404 of the debris 203, an observed distance 406 between the sensor 106 and the debris 203, an observed size of the debris 203, an observed shape or geometry of the debris 203, etc. For example, the observed position 404 includes positional data such as coordinates (e.g., a value corresponding to an x-coordinate, a value corresponding to a y-coordinate, etc.). In particular, such sensor data enables the controller 102 to determine whether the debris 203 is disposed on the surface(s) 122, 124 and in the FOV 402 as well as determine a particular adjustment for the motor(s) 104 that properly positions the nozzle 202 near the debris 203 and/or aims the nozzle 202 thereat.

Some disclosed examples discreetly position the cleaning assembly 200 (e.g. before or after removing the debris 203) such that the components (e.g., the nozzle 202, the arm 204, etc.) associated therewith do not interfere with the sensor 104. That is, in such examples, the components of the cleaning assembly 200 are positioned outside the FOV 402 of the sensor 106 such that they do not interfere with operation of the sensor 106, as shown in FIG. 4. As such, in this example, the nozzle 202 and the arm 204 are considered to be in a second position. Although FIG. 4 depicts the track 108 positioned on the exterior surface 110 of the vehicle 100, in some examples, the track 108 is recessed beneath the exterior surface 110.

Figure 5:
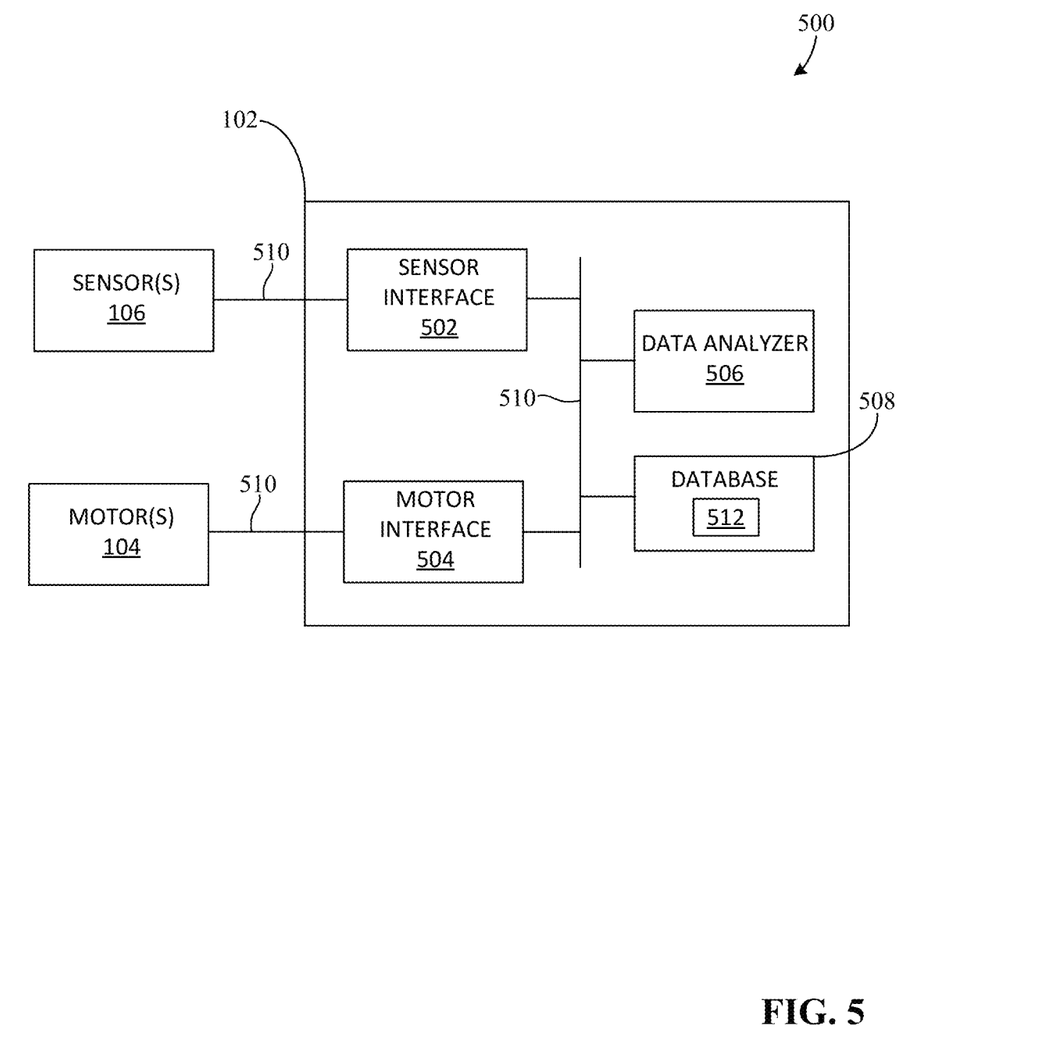
FIG. 5 is a block diagram of an example cleaning system to implement the examples disclosed herein.

FIG. 5 is a block diagram of an example cleaning system 500 to implement the examples disclosed herein. According to the illustrated example of FIG. 5, the cleaning system 500 includes the vehicle controller 102 of FIG. 1A, which includes an example sensor interface 502, an example motor interface 504, an example data analyzer 506, and an example database 508. The cleaning system 500 also includes one or more of the sensor(s) 106 and one or more of the motor(s) 104. The cleaning system 500 of FIG. 5 is communicatively coupled to the sensor(s) 106 and the motor(s) 104 via one or more example communication links 510 such as, for example, a signal or transmission wire, a bus, radio frequency, etc.

In particular, the cleaning system 500 of FIG. 5 detects and/or determines, via example data 512 (e.g., stored in the database 508), when sensor debris is positioned on one or more of the vehicle surfaces 122, 124 and in a FOV (e.g., FOV 402) associated with the sensor(s) 106. In response, the cleaning system 500 directs the motor(s) 104 to (a) control a position and/or an orientation of the nozzle 202 and (b) expel the fluid(s) 206, 208 therefrom to remove the debris. To determine when to implement such debris removal, the data analyzer 506 processes the data 512 to identify a particular signature in the data 512 and/or a sensor condition associated with the sensor debris, as discussed further below.

The sensor interface 502 of FIG. 5 is communicatively coupled, via the link(s) 510, to the sensor(s) 106 to receive sensor data generated thereby. As such, at least some of the data 512 of FIG. 5 includes positional data, distance data, image data, and/or any other appropriate sensor data associated with the vehicle 100 and/or autonomous functionality. In some examples, at least some of the data 512 indicates one or more observed parameters associated with debris (e.g., the example debris 203) on the vehicle 100. For example, the observed parameter(s) include values (e.g., numerical values) corresponding to one or more of the observed position 404 of the debris 203, the observed distance 406 of the debris 203, the observed size of the debris 203, the observed shape or geometry of the debris 203, and/or any other appropriate parameter associated with the debris 203. Accordingly, based on the data 512, the data analyzer 506 calculates and/or determines the observed parameter(s), for example, via one or more related equations and/or algorithms or methods.

The motor interface 504 of FIG. 5 is communicatively coupled, via the link(s) 510, to the motor(s) 104. In particular, the motor interface 504 provides control signal(s) or command(s) and/or power to the motor(s) 104 to generate a force and/or a torque (i.e., motor output) for controlling a position and/or an orientation of the nozzle 202 and the arm 204. Additionally, in some examples, such motor output is used to control the pump 214.

In some examples, the motor interface 504 controls the first one of the motor(s) 104 associated with one of the actuator systems 300, 302, thereby moving the nozzle 202 and the arm 204 along the track 108. In some examples, the motor interface 504 controls the third one of the motor(s) 104 associated with the joint 234, thereby changing an orientation of the nozzle 202 and the arm 204. In some examples, the motor interface 504 controls the second one of the motor(s) 104 associated with the pump 214, thereby changing the parameter(s) of the first fluid 206 and/or the second fluid 208.

The database 508 of FIG. 5 stores and/or provides access to at least a portion of the data 512 and/or other appropriate data. In particular, the database 508 is communicatively coupled, via the link(s) 510, to one or more of the sensor interface 502, the motor interface 504, and/or the data analyzer 506. For example, database 508 receives data from the sensor interface 502, the motor interface 504, and/or the data analyzer 506. Conversely, the database 508 provides data to one or more of the sensor interface 502, the motor interface 504, and/or the data analyzer 506.

As previously mentioned, the data analyzer 506 of FIG. 5 performs one or more calculations and/or comparisons based on the data 512 to determine when and/or how to enable the motor interface 504 to control the motor(s) 104. In some examples, the data analyzer 506 compares the observed debris parameter(s) to one or more criteria (e.g., one or more threshold values) to determine whether the debris is on at least one of the vehicle surface(s) 122, 124. For example, when the distance 406 associated with the debris 203 is below a distance threshold, the data analyzer 506 determines that the debris 203 is on the surface(s) 122, 124. In another example, when the size associated with the debris 203 is above a size threshold, the data analyzer 506 determines to provide the fluid(s) 206, 208 to the nozzle 202 at a relatively high fluid pressure and/or flow rate. Additionally, in some examples, after the cleaning system 500 attempts to remove the debris 203, the data analyzer 506 repeatedly performs such calculation(s) and/or comparison(s) to determine whether the debris 203 is substantially removed from the surface(s) 122, 124 and/or otherwise not obstructing the FOV 402.

In some examples, the data analyzer 506 determines one or more adjustments for the motor(s) 104 based on the data 512, for example, via a map, a table, a plot, an empirical relationship, etc. that correlates the observed position 404 to a particular motor adjustment. An example motor adjustment includes increasing, maintaining, or reducing power provided to the motor(s) 104, which increases, maintains, or reduces the output of the motor(s) 104. In particular, the adjustment(s), when applied to the motor(s) 104 by the motor interface 504, properly position and/or orient the nozzle 202 and the arm 204 to enable effective debris removal via the fluid(s) 206, 208. For example, the adjustment(s) cause the nozzle 202 and the arm 204 to move to the first position shown in FIG. 2. In another example, the adjustment(s) cause the nozzle 202 and the arm to move to the second position shown in FIG. 4.

Although an example cleaning system 500 is illustrated in FIG. 5, one or more of the elements, processes, and/or devices depicted in FIG. 5 may be combined, divided, rearranged, omitted, eliminated, and/or implemented in any other way. Further, the example cleaning system 500 of FIG. 5 may include one or more elements, processes, and/or devices in addition or alternatively to those illustrated in FIG. 5, and/or may include more than one of any or all of the illustrated elements, processes, and devices.

Additionally, one or more of the example elements 102, 502, 504, 506, 508 and/or the example cleaning system 500 of FIG. 5 may be implemented by hardware, software, firmware and/or any combination of thereof. For example, any of the example element(s) 102, 502, 504, 506, 508 and/or the example cleaning system 500 could be implemented by one or more circuits (e.g., an analog or digital circuit, a logic circuit, a programmable processor, etc.). Further, in some examples, at least one of the example element(s) 102, 502, 504, 506, 508 and/or the example cleaning system 500 include(s) a tangible machine-readable storage device or storage disk (e.g., a memory storing the software and/or firmware).

Figure 6:
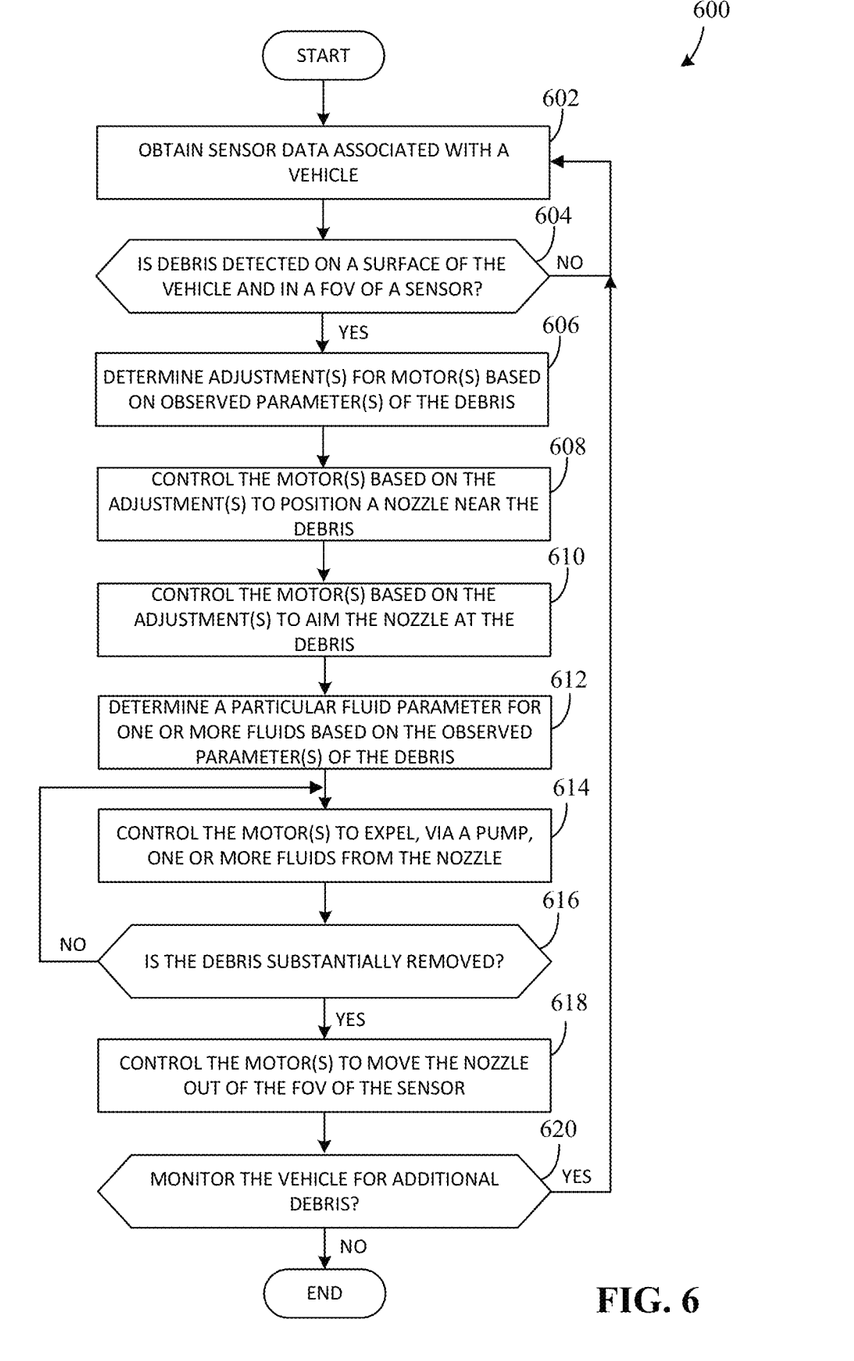
FIG. 6 is a flowchart representative of an example method that may be executed to implement the example cleaning system of FIG. 5.

A flowchart representative of example hardware logic or machine-readable instructions for implementing the example cleaning system 500 of FIG. 5 is shown in FIG. 6. The machine-readable instructions may be a program or portion of a program for execution by a processor (e.g., the CPU 702 (shown in FIG. 7)), which is discussed in greater detail below in connection with FIG. 7. The program may be embodied in software stored on a tangible machine-readable storage medium such as a CD-ROM, a floppy disk, a hard drive, or a memory associated with the processor. Alternatively, the entire program and/or parts thereof could be executed by a different device and/or embodied in firmware or dedicated hardware.

The example processes of FIG. 6 may be implemented using executable or coded instructions (e.g., computer or machine readable instructions) stored on a tangible machine-readable storage medium such as a hard disk drive, a compact disk (CD), a flash memory, and/or other storage device or disk in which information is stored for any duration of time. As used herein, the term tangible machine-readable storage medium is expressly defined to include any type of computer or machine-readable storage device or disk and to exclude propagating signals and all transmission media. Additionally or alternatively, the example method of FIG. 6 may be implemented using coded instructions stored on a non-transitory machine-readable medium in which information is stored for any duration, which includes any type of computer or machine readable storage device or disk and excludes propagating signals and transmission media.

FIG. 6 is a flowchart representative of an example method 600 that can be executed to implement the cleaning system 500 of FIG. 5. The example method 600 of FIG. 6 can be implemented in any of the example vehicle 100 of FIG. 1A, the example cleaning assembly 200 of FIGS. 2-4, and/or the cleaning system 500 of FIG. 5.

The method 600 of FIG. 6 begins by obtaining sensor data associated with a vehicle (block 602). In some examples, the cleaning system 500 of FIG. 5 obtains (e.g., via the sensor interface 502) at least a portion of the data 512 from the sensor(s) 106.

The method 600 of FIG. 6 also includes determining whether debris is detected on a surface of the vehicle and in a FOV of a sensor (block 604). In some examples, the cleaning system 500 of FIG. 5 processes (e.g., via the data analyzer 506) the data 512 to determine whether the debris 203 is disposed on at least one of the surface(s) 122, 124 of the vehicle 100 and in the FOV 402 associated with the sensor(s) 106, as previously disclosed. In some examples, if the cleaning system 500 provides a positioned determination (block 604: YES), control of the method 600 proceeds to block 606. In some examples, if the cleaning system 500 provides a negative determination (block 604: NO), control of the method 600 returns to block 602.

The method 600 of FIG. 6 also includes determining adjustment(s) for motor(s) based on observed parameter(s) of the debris (block 606). In some examples, the cleaning system 500 of FIG. 5 determines (e.g., via the data analyzer 506) one or more adjustments for the motor(s) 104 based on one or more observed parameters of the debris 203. As previously mentioned, the cleaning system 500 of FIG. 5 calculates (e.g., via the data analyzer 506) one or more observed debris parameters based on the data 512 such as, for example, the observed position 404, the observed distance 406, the observed size, the observed shape or geometry, etc. In some examples, an example motor adjustment includes increasing, decreasing, or maintaining output (e.g., a toque and/or a force) of the motor(s) 104.

The method 600 of FIG. 6 also includes controlling the motor(s) based on the adjustment(s) to position a nozzle near the debris (block 608). In some examples, the cleaning system 500 of FIG. 5 controls (e.g., via the motor interface 504) the motor(s) 104 based on the adjustment(s) determined in connection with block 606, thereby positioning the nozzle 202 and the arm 204 near the debris 203. For example, the cleaning system 500 adjusts output of the first one of the motor(s) 104 to move the nozzle 202 and the arm 204 along the track 108 to the first position of FIG. 2.

The method 600 of FIG. 6 also includes controlling the motor(s) based on the adjustment(s) to aim the nozzle at the debris (block 610), In some examples, the cleaning system 500 of FIG. 5 controls (e.g., via the motor interface 504) the motor(s) 104 based on the adjustment(s) determined in connection with block 606, thereby aiming the nozzle 202 at the debris 203. For example, the cleaning system 500 adjusts output of the third one of the motor(s) 104 to rotate the first and second portions 220, 222 of the arm 204 relative to the one or more axes 238 define by the joint 234 of the arm 204. In this manner, the cleaning system 500 positions the nozzle 202 closer to the debris 203 and/or otherwise further reduces (e.g., minimizes) the distance 218. Thus, in some examples, the cleaning system 500 adjusts the first one of the motor(s) 104 and/or the third one of the motor(s) 104 to properly move and/or position the nozzle 202 and the arm 204.

The method 600 of FIG. 6 also includes determining a particular fluid parameter for one or more fluids based on the observed parameter(s) of the debris (block 612). In some examples, the cleaning system 500 of FIG. 5 determines (e.g., via the data analyzer 506) a particular fluid pressure (e.g., a relatively high fluid pressure) and/or a particular flow rate (e.g., a relatively high flow rate) for the first fluid 206 and/or the second fluid 208 based on the observed debris parameter(s) of the debris 203, which may be particularly effective in removing the debris 203.

The method 600 of FIG. 6 also includes controlling the motor(s) to expel, via a pump, one or more fluids from the nozzle (block 614). In some examples, the cleaning system 500 of FIG. 5 controls (e.g., via the motor interface 504) the second one of the motor(s) 104 associated with the pump 214, thereby causing the first fluid 206 and/or the second fluid 208 to eject from the nozzle 202 toward the debris 203 and/or an area of the surfaces(s) 122, 124 proximate to the debris 203. In some examples, the cleaning system 500 provides the first fluid 206 and/or the second fluid to the nozzle 202 in accordance with the particular fluid parameter(s) determined in connection with block 612. Stated differently, in such examples, the cleaning system 500 operates the pump 214 to provide the first fluid 206 and/or the second fluid 208 to the nozzle 202 at the particular fluid pressure and/or flow rate. In some examples, the cleaning system 500 provides the first fluid 206 to the nozzle 202 before the second fluid 208. However, in some examples, the cleaning system 500 only provides the first fluid 206 but not the second fluid 208.

The method 600 of FIG. 6 also includes determining whether the debris is substantially removed (block 616). In some examples, the cleaning system 500 of FIG. 5 performs additional processing (e.g., via the data analyzer 506) of the data 512. Based on such processing, the cleaning system 500 of FIG. 5 detects and/or determines (e.g., via the data analyzer 506) whether the debris 203 is substantially removed from the surface(s) 122, 124 and/or out of the FOV 402. In some examples, if the cleaning system 500 determines that the debris 203 is substantially removed (block 616: YES), control of the method 600 proceeds to block 618. In some examples, if the cleaning system 500 determines that the debris 203 is not substantially removed (block 616: NO), control of the method 600 returns to block 614.

The method 600 of FIG. 6 also includes controlling the motor(s) to move the nozzle out of the FOV of the sensor (block 618). In some examples, the cleaning system 500 of FIG. 5 controls (e.g., via the motor interface 504) the motor(s) 104, thereby causing the nozzle 202 and the arm 204 to move and/or change orientation such that the nozzle 202 and the arm 204 are not positioned in the FOV 402 associated with the sensor(s) 106. For example, the cleaning system 500 adjusts the output of the first one of the motor(s) 104 and/or the third one of the motor(s) 104 to move the nozzle 202 and the arm 204 to the second position of FIG. 4.

The method 600 of FIG. 6 also includes determining whether to monitor the vehicle for additional debris (block 620). In some examples, the cleaning system 500 of FIG. 5 determines (e.g., via the data analyzer 506) whether to monitor the vehicle 100 for additional debris. In some examples, if the cleaning system 500 determines not to performing monitoring (e.g., when the vehicle 100 is not in operation) (block 620: NO), the method 600 ends. In some examples, if the cleaning system 500 determines to perform monitoring (e.g., when the vehicle 100 is in operation) (block 620: YES), control of the method 600 returns to block 602.

Although the example method 600 is described in connection with the flowchart of FIG. 6, other methods of implementing the example cleaning system 500 may alternatively be used. For example, the order of execution of the blocks may be changed, and/or some of the blocks described may be changed, eliminated, or combined.

Figure 7:
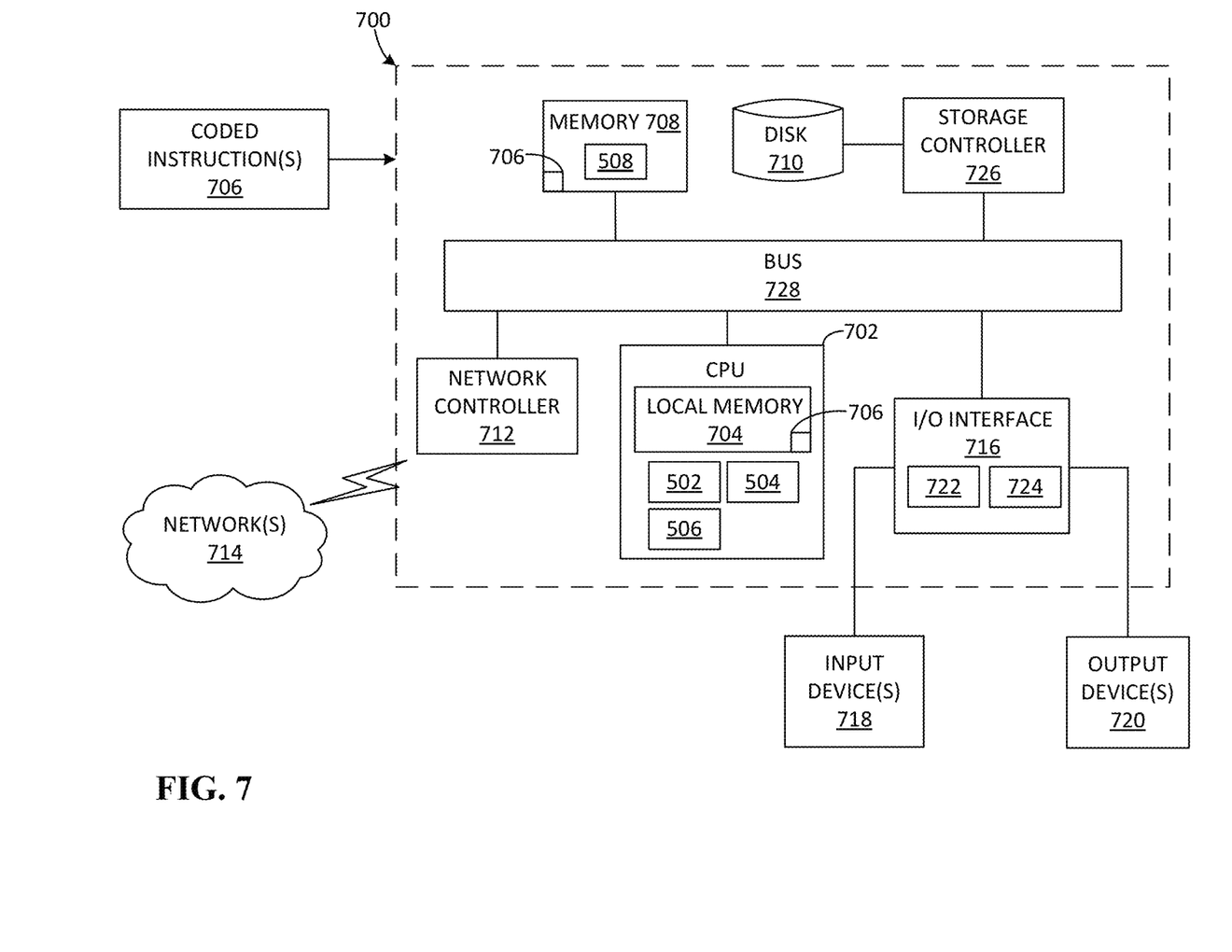
FIG. 7 is a block diagram of an example processor platform structured to execute instructions to carry out the example method of FIG. 6 and/or, more generally, to implement the example cleaning system of FIG. 5.

FIG. 7 is a block diagram of an example processor platform 700 capable of executing instructions to implement the method of FIG. 6 and the cleaning system 500 of FIG. 5. For example, the processor platform 700 can be a personal computer, a server, a mobile device (e.g., a cell phone, a smart phone, a tablet, etc.) or any other type of computing device. According to the illustrated example of FIG. 7, the processor platform 700 includes a central processing unit (CPU) 702 (sometimes referred to as a processor), which is hardware (e.g., one or more integrated circuits, logic circuits, microprocessors, etc.). The CPU 702 of FIG. 7 includes a local memory 704 such as, for example, a cache. According to the illustrated example of FIG. 7, the CPU 702 implements the example sensor interface 502, the example motor interface 504, and the example data analyzer 506.

Coded instruction(s) 706 to implement the method of FIG. 6 may be stored in a main memory 708 of the processor platform 700. The memory 708 may include a volatile memory (e.g., random access memory device(s) such as Dynamic Random Access Memory (DRAM)) and a non-volatile memory (e.g., flash memory). Such processes and/or instructions may also be stored on a storage medium disk 710 associated with the processor platform 700, such as a hard drive (HDD) or portable storage medium, or may be stored remotely. Further, the claimed advancements are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the processor platform 700 communicates, such as a server or computer.

Further, the claimed advancements may be provided as a utility application, background daemon, or component of an operating system, or combination thereof, executing in conjunction with the CPU 702 and an operating system such as, for example, Microsoft Windows 7, UNIX, Solaris, LINUX, Apple MAC-OS or any other system(s) known to those skilled in the art.

The hardware elements in order to achieve the processor platform 700 may be realized by various circuitry elements, known to those skilled in the art. For example, the CPU 702 may be a Xenon or Core processor from Intel of America or an Opteron processor from AMD of America, or may be other processor types that would be recognized by one of ordinary skill in the art. Alternatively, the CPU 702 may be implemented on an FPGA, ASIC, PLD or using discrete logic circuits, as one of ordinary skill in the art would recognize. Further, the CPU 702 may be implemented as multiple processors cooperatively working in parallel to perform the instructions of the inventive processes described above.

In some examples, the processor platform 700 of FIG. 7 also includes a network controller 712 such as, for example, an Intel Ethernet PRO network interface card from Intel Corporation of America for interfacing with one or more networks 714. As can be appreciated, the network(s) 714 can be one or more public networks (e.g., the Internet), private networks (e.g., a local area network (LAN), a wide area network (WAN), etc.) and/or sub-networks (e.g., a public switched telephone network (PSTN), an integrated services digital network (ISDN), etc.). The network(s) 714 can also be wired, such as an Ethernet network, or can be wireless such as a cellular network including EDGE, 3G and 4G wireless cellular systems. The wireless network can also be WiFi, Bluetooth, or any other wireless form of communication that is known.

The processor platform 700 of FIG. 7 includes a general purpose I/O interface circuit 716 that interfaces and/or otherwise communicates with one or more input devices 718 and/or one or more output devices 720. The I/O interface circuit 716 of FIG. 7 may be implemented as an Ethernet interface, a universal serial bus (USB), a PCI express interface, and/or any other type of standard interface.

The input devices 718 are connected to the I/O interface 716 and may include, for example, a keyboard, a mouse, a touchscreen, a button, a microphone, a voice recognition system, a camera, and/or any other suitable device(s) for enabling a user to input data and/or commands to the CPU 702. As such, in some examples, the I/O interface circuit 716 typically includes a display controller 722 such as, for example, a NVIDIA GeForce GTX or Quadro graphics adaptor from NVIDIA Corporation of America for interfacing with a display (e.g., a Hewlett Packard HPL2445w LCD monitor).

The output device(s) 720 are also connected to the I/O interface circuit 716 and may include display devices such as, for example, a light-emitting diode (LED), a liquid crystal display, a touchscreen, a printer, a scanner (e.g., an OfficeJet or DeskJet from Hewlett Packard), a speaker, and/or any other device(s) for providing or presenting information (e.g., visual information and/or audible information) to a user. As such, in some examples, the I/O interface circuit includes a sound controller 724 such as, for example, Sound Blaster X-Fi Titanium from Creative, to interface with a speaker and/or a microphone.

The processor platform 700 of FIG. 7 also includes a general purpose storage controller 726 that connects the storage medium disk 710 with a communication bus 728. The storage controller 726 may also control access to the memory 708. The communication bus 728 of FIG. 7 may be an ISA, EISA, VESA, PCI, etc. for interconnecting all of the components of the processor platform 700. For example, the CPU 702 communicates with the main memory 708 via the bus 728.

It will be appreciated that the systems, apparatus, and methods disclosed in the foregoing description provide numerous advantages. Examples disclosed herein enable the effective removal of sensor debris from a FOV associated with one or more vehicle sensors, which improves vehicle safety and/or autonomous vehicle functionality.

Although certain example apparatus, systems, and methods have been disclosed herein, the scope of coverage of this patent is not limited thereto. Obviously, numerous modifications and variations are possible in light of the above teachings. It is therefore to be understood that within the scope of the appended claims, the invention may be practiced otherwise than as specifically described herein.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

What is claimed is:

1. A vehicle, comprising:
    a controller configured to:
        control a first motor operatively coupled to an arm having a nozzle positioned thereon, the arm adjustably coupled to a track on the vehicle and configured to move, via output of the first motor, along the track relative to sensor debris on an exterior surface of the vehicle, the nozzle receives a fluid and directs the fluid away therefrom;
        detect the sensor debris via a sensor;
        adjust the output of the first motor in response to the detection to position the nozzle proximate to the sensor debris such that the fluid removes the sensor debris from the exterior surface; and
        control a second motor operatively coupled to a joint of the arm interposed between first and second portions of the arm, the first or second portion configured to rotate, via output of the second motor, relative to an axis defined by the joint to change an orientation of the nozzle.

2. The vehicle of claim 1, wherein the controller adjusts the output of the first or second motor to position the arm and the nozzle outside of a field of view associated with a sensor after the debris is removed.

3. The vehicle of claim 1, wherein the controller is configured to:
    determine, via a sensor, an observed parameter of the debris; and
    adjust the output of the first or second motor based on the observed parameter.

4. A tangible machine-readable storage medium comprising instructions that, when executed, cause a processor to at least:
    control a first motor operatively coupled to an arm having a nozzle positioned thereon, the arm adjustably coupled to a track on the vehicle and configured to move, via output of the first motor, along the track relative to sensor debris on an exterior surface of the vehicle, the nozzle receives a fluid and directs the fluid away therefrom;
    detect the sensor debris via a sensor;
    adjust the output of the first motor in response to the detection to position the nozzle proximate to the sensor debris such that the fluid removes the sensor debris from the exterior surface; and
    control a second motor operatively coupled to a joint of the arm interposed between first and second portions of the arm, the first or second portion configured to rotate, via output of the second motor, relative to an axis defined by the joint to change an orientation of the nozzle.

5. The tangible machine-readable storage medium of claim 4, wherein the instructions cause the processor to adjust the output of the first or second motor to position the arm outside of a field of view associated with the sensor after the debris is removed.

6. The tangible machine-readable storage medium of claim 4, wherein the instructions cause the processor to:
    determine, via a sensor, an observed parameter of the debris; and
    adjust the output of the first or second motor based on the observed parameter.

7. The tangible machine-readable storage medium of claim 6, wherein the instructions cause the processor to:
    determine a fluid pressure or flow rate for the fluid based on the observed parameter of the debris; and
    control a pump that is fluidly coupled to the nozzle to provide the fluid to the nozzle at the fluid pressure or flow rate.

* * * * *